April 7, 1964 K. M. GORDON 3,127,761
BEARING RADIAL LOAD TORQUE TEST INSTRUMENT
Filed March 29, 1961 2 Sheets-Sheet 1

INVENTOR
Keith M. Gordon
BY
Pennie, Edmonds, Morton, Barrows and Taylor
ATTORNEYS April 7, 1964  K. M. GORDON  3,127,761
BEARING RADIAL LOAD TORQUE TEST INSTRUMENT
Filed March 29, 1961  2 Sheets-Sheet 2

INVENTOR
Keith M. Gordon
BY
Pennie, Edmonds, Morton, Barrows and Taylor
ATTORNEYS United States Patent Office 3,127,761
Patented Apr. 7, 1964

3,127,761
BEARING RADIAL LOAD TORQUE
TEST INSTRUMENT
Keith M. Gordon, Munsonville, N.H., assignor to Miniature Precision Bearings, Inc., Keene, N.H., a corporation of New Hampshire
Filed Mar. 29, 1961, Ser. No. 99,221
7 Claims. (Cl. 73—9)

The present invention relates to instruments for testing anti-friction bearings of the type having inner and outer race members and rolling elements therebetween, and in particular to an instrument adapted to test such a bearing by providing an accurate measurement of the running torque transmitted from one race member to the other race member by imperfections in the coacting surfaces of the race members and rolling elements.

In the manufacture and use of precision anti-friction rolling bearings, particularly those of the miniature instrument type, running torque characteristics of the bearings are of great importance. The precision measurement of running torque of miniature ball-bearings that are to be used in inertial guidance gyroscopes, fire-control instruments and the like is of great significance in order that the user may be assured of long-term, high-quality instrument performance.

It is significant to note that all of the known practical torque-test instruments that have been proposed in the prior art are adapted to measure running torque of a test bearing subjected to axial or thrust loading. In the majority of instrument bearing applications, however, the bearings are not subjected to pure thrust or axial loads but rather pure radial loads or at least combinations of radial and thrust loads. Thus the proposed prior art test instruments are incapable of providing important data with respect to the performance of anti-friction bearings operating under radial loads.

Accordingly, it is a principal object of the present invention to provide a precision bearing test instrument that is capable of accurately measuring the running torque of even the most miniature radially loaded anti-friction instrument bearings.

To this end a precision rotatable spindle supported by a cylindrical gas bearing is provided to drive one race of the test bearing. A low mass precision rotor is clamped to the other bearing race and gas pads are provided to radially load the rotor so that a substantially friction-free true radial load is placed on the test bearing. Rotation of the low mass rotor is restrained by a relatively stiff spring member. Actual rotational displacement of the rotor is sensed by a displacement sensitive transducer to provide an accurate measure of both average and instantaneous running torque for the test bearing. The natural resonant frequency of the rotor, which has a low moment of inertia, and the torque restraining member, which has a relatively high spring constant, is maintained at a desirably high frequency well above the highest torque impulse frequency to be measured.

One of the outstanding advantages of the test instrument provided by the present invention resides in the fact that the friction-free radial loading of the test bearing by gas pads introduces no undesired reaction or interference with the running torque measurement. Thus the desired true running torque is measured as a function of true radial load on the test bearing.

A further important advantage offered by the invention is that the rotational runout or eccentricity of the precision gas-bearing supported spindle is extremely small. This feature is significant since a gross amount of spindle runout would be sensed by the transducer and would accordingly produce a spurious torque output signal. At the same time the full cylindrical gas-bearing provides a stiff and substantially friction-free support for the spindle so that selected variations in gas-pad radial loading do not shift the spindle axis of rotation or otherwise produce undesired distortions in the torque measurement.

In a preferred embodiment of the invention, an air-bearing supported spindle is horizontally disposed in a massive housing defining the cylindrical outer wall and the jet nozzles for the air-bearing. The housing also defines a fractional cylindrical outer wall and the radial loading jets for a low mass cylindrical rotor which is clamped to the bearing outer race. The test bearing inner race is supported on a small shaft extension from the main spindle which is coaxially aligned with the spindle axis of rotation. Under radial load from the air jets, the cylindrical rotor is free to move in the axial direction so that the bearing races and the ball elements are free to seek a desired centered alignment whereby a true radial load is placed on the bearing. The precision spindle is rotated at a predetermined relatively slow speed and rotational displacement of the rotor against the restraining force of a cantilever spring member is sensed by a displacement-sensitive transducer. The cantilever spring effectively applies a restoring torque to the rotor which is proportional in magnitude to the rotational displacement of the rotor. The rotor is thereby maintained at an equilibrium position indicative of the magnitude of the running torque. The transducer output signal is amplified and supplied to indicator and recording means which are advantageously calibrated to measure running torque in conventional units of torque.

Referring to the drawings in which a preferred embodiment of the invention is shown:

Figure 1:
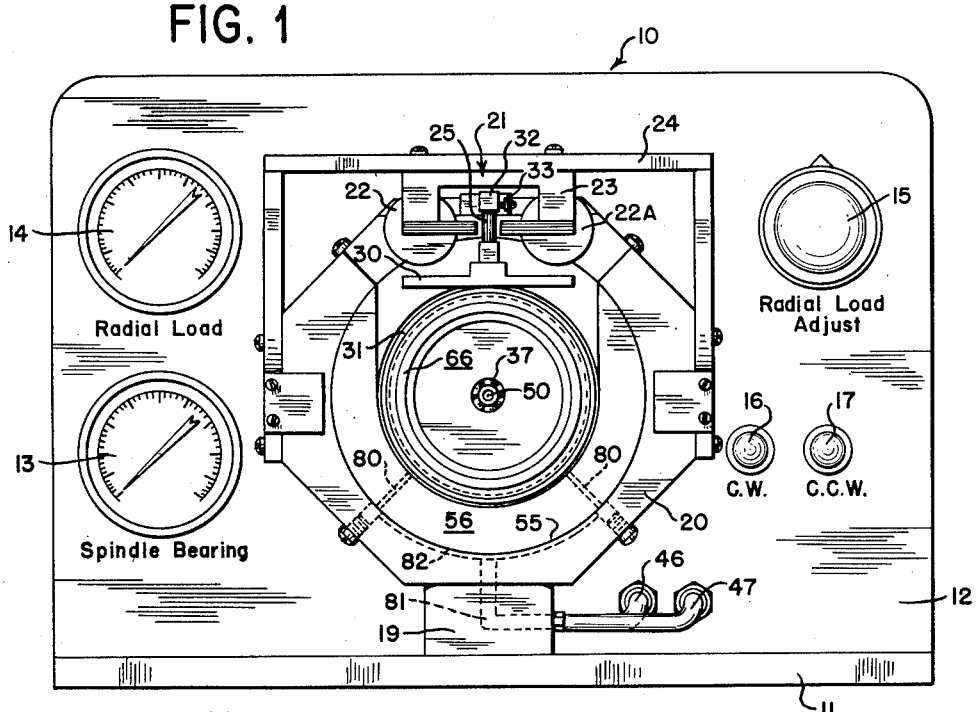
FIG. 1 is a front elevational view of a radial load torque test instrument constructed in accordance with the invention.

Referring to the drawings in detail and in particular to FIG. 1, 10 denotes generally a radial load bearing torque test instrument constructed according to the invention having a base stand 11, a control panel 12 on which are mounted air pressure gauges 13 and 14, knob 15 for controlling radial load air pressure read on gauge 14, and electrical drive-motor switch controls 16 and 17. The gauge proper, which is supported on stand 11 by pestal 19, includes a massive octagonal shaped metal housing 20 which supports both the electrical and mechanical portions of the test instrument. An electrical displacement-sensitive transducer 21 having a pair of coils 22 and 22A mounted on a fixed position magnetic core 23 is mounted over the end portion of the housing by bridge member 24. The movable portion of the transducer comprises arm 25 which is fixedly attached at its lower end to cross member 30 and rotor 31. Arm 25 supports a small permanent magnet 32 at its uppermost end which functions to hold the arm 25 against the rounded soft iron tip 33 of cantilever spring 34. The opposite end of spring 34 is firmly anchored to housing 20 by clamp 35.

Figure 2:
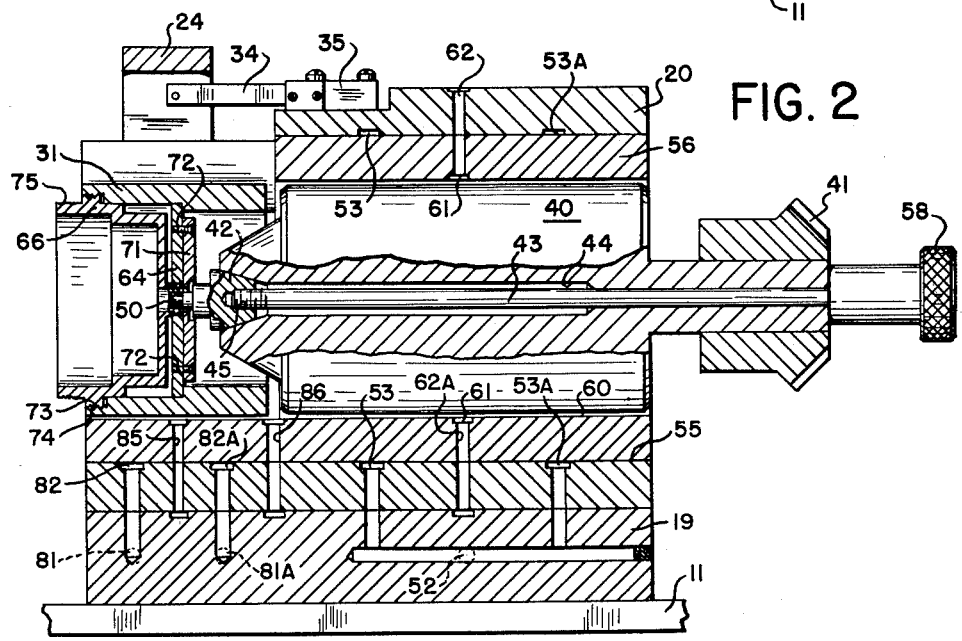
FIG. 2 is a side sectional view of the torque test instrument in FIG. 1 with the control panel and torque measuring transducer removed.
Figure 3:
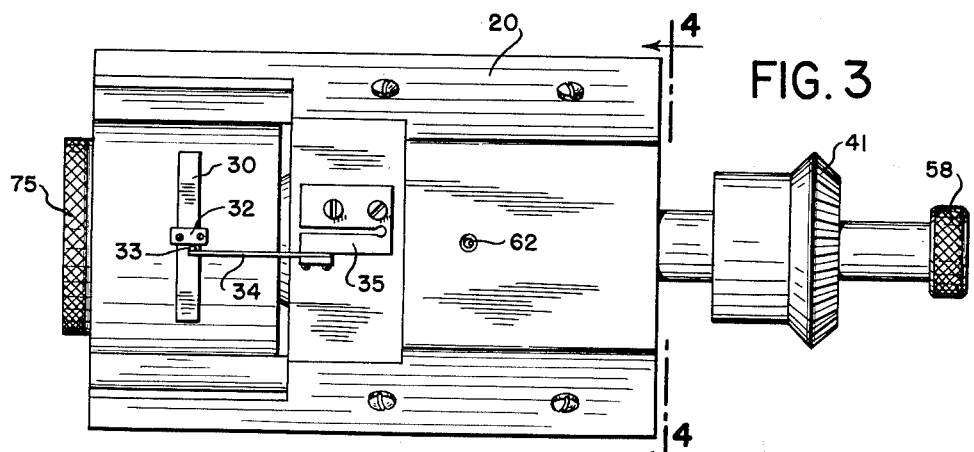
FIG. 3 is a top plan view of the torque test instrument of FIG. 1 with the control panel and torque measuring transducer removed.
Figure 5:
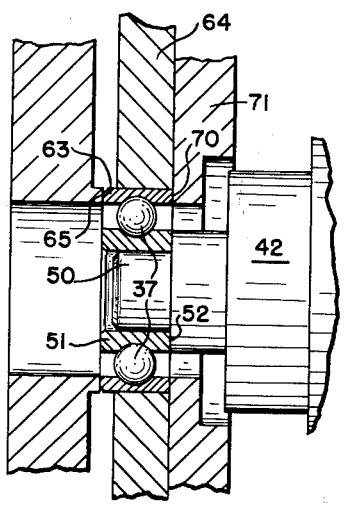
FIG. 5 is an enlarged fragmentary sectional view of the test bearing with the inner race mounted on the spindle shaft and the outer race face-clamped to the rotor.

Operation of the test instrument provided by the invention is best understood by referring to the partial sectional drawings shown in FIGS. 2 and 5. Support and drive for the test bearing is provided by a relatively large horizontally disposed precision cylindrical spindle 40 which is adapted to be slowly driven in rotation by a drive motor (not shown) through bevel gear 41. The outside diameter of the cylindrical spindle is machined to a substantially constant diameter throughout the full length of the bearing surface (major diameter) and one end of the spindle is taper bored to receive a removable tapered arbor spindle 42. Arbor spindle 42 is retained in the tapered bore of spindle 40 by locking shaft 43 which extends through a central axial bore 44 in the main spindle into a mating threaded bore 45 in 42. A reduced shaft extension 50 is provided on the arbor spindle to mate snugly with the inner race 51 of the test bearing which includes ball elements 37 and outer race 63. The rear face of the bearing inner race is pressed in contact with shoulder 52. Shaft extension 50 is accurately machined with reference to the tapered receiving bore in the main spindle and the axis of rotation for the main spindle so that a common axis of rotation is maintained throughout. The tapered arbor spindle is easily removed from the main spindle by rotating knurled knob 58. This tooling feature expedites conversion to accommodate bearings of different sizes.

Figure 4:
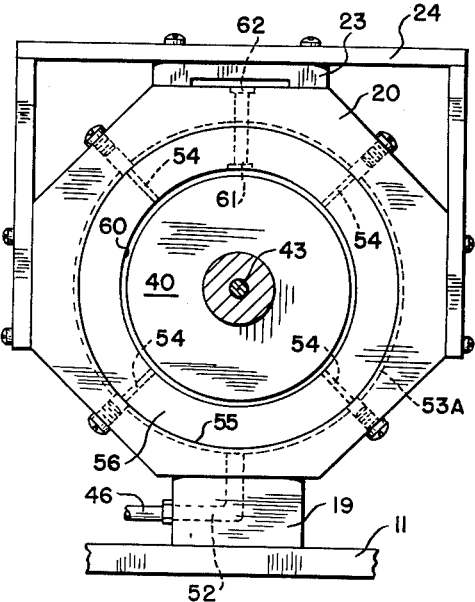
FIG. 4 is a rear elevational view of the test instrument shown in FIG. 3.

The main spindle is supported for substantially friction-free and wobble-free rotation by a full cylindrical air bearing. Two rows of four air jets per row are supplied by compressed air through conduit 46, bore 52 and manifold ducts 53 and 53A. The four jets 54 in each row are equally spaced at 90° intervals as indicated in FIG. 4. For ease of construction, the manifold ducts are advantageously cut circumferentially around the inside wall surface 55 of the main housing 20 and a cooperating annular sleeve 56 defining eight air jets and the cylindrical outer wall bearing surface 60 is provided as an insert in the main housing. The diameter of the cylindrical surface 60 is made substantially constant throughout the full length of the annular portion of the sleeve and just slightly larger than the outside diameter of spindle 40. Air flow from the jet nozzles through the annular passage between the spindle and the wall surface 60 serves to support the spindle for friction-free rotation. Air flow is exhausted at the center of the bearing through circumferential duct 61 and exhaust ports 62 and 62A and through the open ends of the bearing.

While the inner race of the test bearing is supported on 50 for substantially friction-free and wobble-free rotation, outer race 63 of the test bearing is snugly mated in a central bore of adaptor plate 64 of light-weight annular shaped rotor 31. The outer race is effectively clamped to the rotor between the raised back surface 65 of outer clamp 66 and surface 70 of inner clamp plate 71. Clamp plate 71 is secured to adaptor plate 64 by screws 72 as shown. Outer clamp 66 is cup shaped as shown and carries a threaded portion 73 which is adapted to mate with the inside threaded section 74 of rotor 31. Surface 75 is knurled to simplify removal of the outer clamp and the test bearing from the rotor.

When the inner race 51 of the test bearing is rotated, a rotational torque is coupled to the outer race 63 via frictional forces between the ball elements and the respective races. In the absence of any radial load on the bearing, this coupled torque is very small, particularly with miniature instrument type bearings. Even when such bearings are subjected to normal operating radial loads, both the average and the instantaneous torque variations that must be sensed and indicated are still very minute. Accordingly, it is of utmost importance that provision be made for radially loading the test bearing which will not interfere with the torque measurement by frictionally loading either of the races.

In accordance with the teachings of the invention, radial loading is applied to the outer race of the test bearing by a partial cylindrical air bearing. In the preferred embodiment of the invention, air pressure is applied to only the lower cylindrical surface of the rotor 31 via two rows of two jets 80. Air pressure is supplied to each pair of jets via supply bores 81, 81A and manifold ducts 82, 82A. The upper portions of both the housing 20 and the annular sleeve 55 are cut away in the front portion of the test instrument over the rotor 31 (see FIGS. 1, 2 and 4). The cylindrical wall surface 60 of sleeve 55 is continued through the full length of the housing for approximately the lower half of the sleeve as shown. This partial cylindrical surface defines the four loading nozzles which act against the lower uniform cylindrical surface of the rotor. The diameter of the rotor is made substantially constant throughout its length and the surfaces of the rotor, the spindle and the wall 60 are machined and lapped to provide smooth uniform surfaces. The central bore of the rotor adaptor plate is accurately bored so that the axis of rotation for the rotor is substantially through the center of the rotor. Ducts 85 and 86 exhaust air flow from the radial loading jets around the lower extremities of the rotor. The two pairs of air jet nozzles supplied by duct 82 and 82A, respectively, are spaced radially at 45° on either side of the vertical centerline of the bearing axis and equal axial distances from the vertical centerline through the ball elements and the race centers. Since the rotor 31 clamped to the outer race is free to move in the direction of the bearing axis, the races and ball elements effectively become self-aligned with application of air pressure to the four radial loading jets and a true radial load is applied to the test bearing.

As explained above, rotation of rotor 31 in either direction is restrained by cantilever spring 34. Rotational displacement of arm 25, which is proportional to running torque of the test bearing, is sensed by a conventional displacement-sensitive transducer 21. The transducer shown in the drawings is a variable reluctance, self-induction differential type transducer such as described on page 45 of "Instrumentation In Scientific Research" by Kurt S. Lion published by McGraw-Hill in 1959. This transducer, which will not be described further herein, produces an output signal the magnitude of which varies with displacement and the sign or polarity of which varies with direction. It will be apparent that other conventional transducers such as the linear differential transformer may be substituted where desired to provide equivalent measurement results.

Figure 6:
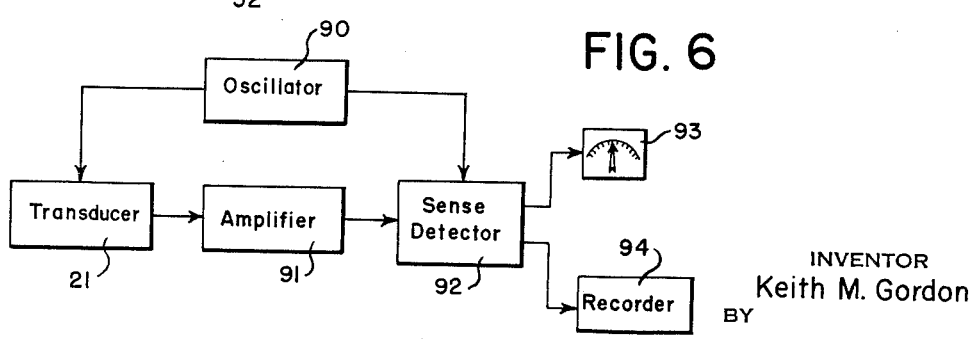
FIG. 6 is a simplified block diagram illustrating an electrical transducer circuit suitable for measuring bearing running torque.

As shown in FIG. 6, the transducer 21 is electrically energized by an A.-C. voltage (e.g., 400 c.p.s.) supplied by oscillator 90. The output signal from transducer 21 is amplified by amplifier 91 and the resulting amplified output signal is detected by a phase-sensitive or synchronous sense detector 92. The output signal from detector 92 is supplied to meter indicator 93 and graph recorder 94. Other known indicator and recorder means may be employed as required to readout sensed running torque of the radially loaded test bearing. The indicator devices may be used to measure torque in arbitrary units, or where desired the various indicators may be readily calibrated in convenient torque units by placing calibrated weights on the upper surface of cross member 30 at varying distances from the vertical centerline and noting the displacement of the meter indicator, or the graph recorder.

The normal procedure for measuring the running torque of a test bearing with the test instrument provided by the invention will now be described. The air pressure supply to the eight jets of the main spindle is turned on and adjusted to provide a pressure of say 60 to 100 pounds as indicated on gauge 13. An arbor spindle 42 with shaft 50 having the proper diameter to mate with the inner race of the bearing to be tested is then mounted on the spindle and secured in place with the locking shaft 43. With the rotor removed from the housing and the cup shape outer clamp 66 unthreaded and removed from the rotor, the outer race of the test bearing is pressed into the central bore of the adaptor plate previously selected to fit the bearing to be tested. The outer clamp is then returned to clamp position and threaded snugly against the front face of the bearing outer race. The rotor carrying the test bearing is then positioned into the forward part of the housing so that shaft 50 is received by the inner race of the test bearing, arm 25 is centrally disposed in the gap between the legs of magnet 23 and magnet 32 is in contact with 33. Thus mounted, the bearing is ready for test and the drive motor (not shown) is energized to provide either clockwise or counter-clockwise rotation of the spindle by pressing either switch 16 or switch 17. In actual test operation, a spindle rotation speed of approximately 2 r.p.m. has been found to be satisfactory. With the spindle and inner race of the bearing rotating, a radial load is then applied to the outer race of the bearing by applying air pressure against the lower side of the rotor via conduit 47, manifold ducts 82, 82A and the four jets 80. The magnitude of the radial load is controlled by adjusting knob 15 while reading pressure on gauge 14. In practice a pressure range of one to twenty pounds has been found to be satisfactory for testing miniature instrument bearings. Normally a number of different running torque measurments are made for a given bearing using a number of different radial loads with both clockwise and counter-clockwise rotation. The general overall performance quality of the test bearing operated under predetermined true radial loading is readily evaluated by inspecting the recorded output signal from the transducer.

In an actual working model of the test instrument built in accordance with the invention, excellent performance has been obtained. Maximum measured eccentricity in the shaft 50 has been in the order of a few millionths of an inch. Tests have indicated that geometry errors in the spindle and wall surfaces tend to be self-cancelling rather than additive. Excellent repeatability and reliability in test measurements has been achieved with a minimum of instrument maintenance.

While a preferred embodiment of the invention has been shown and described, it is understood the test instrument illustrated may be structurally modified without departing from the scope of the invention as defined in the following claims.

I claim:

1. A bearing test instrument for measuring the running torque of an anti-friction bearing having inner and outer race members and rolling elements disposed therebetween comprising a housing, a cylindrical spindle rotatably mounted and supported in said housing by a cylindrical gas bearing, said spindle having coaxial shaft means adapted to mate with said inner race member to rotate said inner race about an axis common with the spindle axis of rotation, a rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running torque, gas jet means supported by said housing for supplying a substantially friction-free force against a partial surface of said rotor so as to produce an effective radial load on said bearing, and displacement-sensitive sensing means for measuring the rotational displacement of said rotor.

2. A bearing test instrument for measuring the running torque of an anti-friction bearing having inner and outer race members and rolling elements disposed therebetween comprising a housing, a cylindrical spindle rotatably mounted and supported in said housing by a cylindrical gas bearing, said spindle having coaxial shaft means adapted to mate with said inner race member to rotate said inner race about an axis common with the spindle axis of rotation, a cylindrical rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running torque, means for applying a substantially friction-free force against a partial cylindrical surface of said rotor so as to produce an effective radial load on said bearing, said means comprising a partial cylindrical gas bearing the outer wall of said bearing being supported by said housing, and displacement-sensitive sensing means for measuring the rotational displacement of said rotor.

3. A bearing test instrument for measuring the running torque of an anti-friction bearing having inner and outer race members and rolling elements disposed therebetween comprising a housing, a horizontally disposed cylindrical spindle mounted and supported in said housing by a cylindrical gas bearing, said spindle having coaxial shaft means adapted to mate with said inner race member to rotate said inner race about an axis common with the spindle axis of rotation, a horizontally disposed cylindrical rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running troque, gas jet means supported by said housing for applying a substantially friction-free force against the bottom surface of said cylindrical rotor so as to produce an effective upward radial load on said bearing, and displacement-sensitive sensing means for measuring the rotational displacement of said rotor.

4. A bearing test instrument for measuring the running torque of an anti-friction bearing having inner and outer race members and rolling elements disposed therebetween comprising a housing, a horizontally disposed cylindrical spindle mounted and supported in said housing by a cylindrical gas bearing, said spindle having coaxial shaft means adapted to mate with said inner race member to rotate said inner race about an axis common with the spindle axis of rotation, a horizontally disposed cylindrical rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running torque, means for applying a substantially friction-free force against a partial cylindrical surface of said rotor so as to produce an effective radial load on said bearing, said means comprising a partial cylindrical gas bearing having a plurality of upwardly directed gas jets acting against the bottom surface of said rotor, and displacement-sensitive sensing means for measuring the rotational displacement of said rotor.

5. A bearing test instrument for measuring the running torque of an anti-friction bearing having inner and outer race members and rolling elements disposed therebetween comprising a housing, a cylindrical spindle rotatably mounted and supported in said housing by a cylindrical gas bearing, said spindle having coaxial shaft means adapted to mate with said inner race member to rotate said inner race about an axis common with the spindle axis of rotation, a rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running torque, gas jet means supported by said housing for applying a substantially friction-free force against a partial surface of said rotor so as to produce an effective radial load on said bearing, an electrical displacement-sensitive transducer for measuring the rotational displacement of said rotor, said transducer being adapted to produce an output signal proportional in magnitude to the angular displacement of said rotor, and indicator means for measuring the magnitude of said signal.

6. A bearing torque test instrument as described in claim 1 characterized in that said torque restraining element comprises a cantilever spring member having one end fixedly attached to said housing and the other end magnetically attached to said rotor.

7. A bearing test instrument for measuring the running torque of an anti-friction bearing having inner and outer race members and rolling elements disposed therebetween comprising a housing, a horizontally disposed cylindrical spindle mounted and supported in said housing by a cylindrical gas bearing, said spindle having coaxial shaft means adapted to mate with said inner race member to rotate said inner race about an axis common with the spindle axis of rotation, a horizontally disposed cylindrical rotor having a central bore adapted to receive the outer race of said bearing, clamping means for face clamping said outer race member in the central bore of said rotor, driving means for rotating said spindle, whereby a running torque is applied to said outer race from the inner race through the said rolling elements therebetween, a torque restraining element attached to said rotor, said element being adapted to apply a restoring torque to said rotor in proportion to its rotational displacement to restrain said rotor at an equilibrium position indicative of the magnitude of the bearing running torque, means for applying a substantially friction-free force against a partial cylindrical surface of said rotor so as to produce an effective radial load on said bearing, said means comprising a partial cylindrical gas bearing having a plurality of upwardly directed gas jets acting against the bottom surface of said rotor, an electrical displacement-sensitive transducer for measuring the rotational displacement of said rotor, said transducer being adapted to produce an output signal proportional in magnitude to the angular displacement of said rotor, and recorder means for indicating the magnitude of said signal.

References Cited in the file of this patent

UNITED STATES PATENTS

| | | |
|---|---|---|
| 2,862,385 | Woods | Dec. 2, 1958 |
| 2,957,335 | Dmitroff | Oct. 25, 1960 |
| 3,006,697 | Rawlins | Oct. 31, 1961 |